United States Patent [19]

Neilsen

[11] Patent Number: 4,829,867
[45] Date of Patent: May 16, 1989

[54] PAPER PUNCH APPARATUS WITH IMPROVED PUNCH ELEMENT

[76] Inventor: Hildaur L. Neilsen, 2 Juniper St., Metuchen, N.J. 08840

[21] Appl. No.: 198,669

[22] Filed: May 23, 1988

Related U.S. Application Data

[63] Continuation of Ser. No. 21,999, Mar. 5, 1987, abandoned.

[51] Int. Cl.[4] .............................................. B26F 1/32
[52] U.S. Cl. ...................................... 83/618; 83/687; 83/689
[58] Field of Search ................. 83/167, 618, 620, 622, 83/633, 636, 685–689

[56] References Cited

U.S. PATENT DOCUMENTS

| 1,322,876 | 11/1919 | Cameron | 83/689 |
| 3,073,199 | 1/1963 | Yerkes | 83/618 |
| 3,125,883 | 3/1964 | Wollner | 83/684 X |

FOREIGN PATENT DOCUMENTS 140201  3/1920  United Kingdom ................ 83/689

Primary Examiner—Frank T. Yost
Assistant Examiner—Hien H. Phan
Attorney, Agent, or Firm—Klauber & Jackson

[57] ABSTRACT

A paper punch which has a body defining a gap for insertion of the material to be punched and has at least one punch hole at the bottom of the gap and includes guides for guiding a punching element across the gap into the punch hole, also includes at least one cylindrical punching element which is disposed to be guided into the punch hole and has a cutting end with a cutting edge which extends helically along at least one-half of the circumference of the punching element. Preferably the punching element is hollow and is formed from a shaped sheet of metal.

2 Claims, 3 Drawing Sheets

PAPER PUNCH APPARATUS WITH IMPROVED PUNCH ELEMENT

This application is a continuation of application Ser. No. 21,999, filed 3/5/87, now abandoned.

FIELD OF THE INVENTION

This invention relates to paper punches and is more particularly concerned with paper punches of the type wherein the end of each punching element passes across a gap and then through a cooperating punch or die hole in the punch body.

BACKGROUND OF THE INVENTION

Paper punches of the type in which one or more punching elements perforate the paper inserted in the punch gap and pass through associated punch or die holes in the punch body are well known and are widely used in practically every office.

One known form of punch has a punching element or plunger which is in the form of a solid metal cylinder having essentially a flat end face the circular rim of which provides the cutting edge. In another and common form of paper punch, the punching element or plunger of this type has a groove or recess formed in its cutting end, as shown in my U.S. Pat. No. 3,987,695 of Oct. 26, 1976 (see FIG. 3). A similar construction is shown in British Pat. No. 1,544,694 (see FIGS. 3 and 4).

There is little problem in using paper punches with punching elements or plungers of known type for punching holes in a single sheet of paper, or even in a few sheets of paper inserted simultaneously into the punch. When, however, a relatively large number of sheets, i.e. a small stack, is to be punched at the same time, known paper punches require rather heavy forces to be applied and many will not work at all. Furthermore, when the punching elements of known paper punches of this type are not perfectly aligned so that they are received smoothly and exactly in the die holes in the paper punch body for receiving them, they strike the edges of the holes with their cutting edges and may become severely and irreparably damaged.

It is accordingly an object of the present invention to provide a paper punch embodying a punch element or plunger which avoids the disadvantages and drawbacks of conventional paper punches.

It is another object of the invention to provide a paper punch embodying a paper punching element or plunger having a construction such that substantially less force is necessary to punch a hole in a plurality or stack of sheets of paper simultaneously.

It is another object of the invention to provide a paper punch of the character indicated wherein the punching element is of a construction such that it does not suffer the damage encountered by conventional paper punch elements when they do not meet perfectly with the cooperating punch holes in the punch body.

BRIEF SUMMARY OF THE INVENTION

These and other objects of the invention are achieved by an improved paper punch construction having at least one punching element and a cooperating die hole, wherein each punching element has an end with a paper-cutting edge wherein the cutting edge proceeds from a point at the extreme forward end of the element and follows an ascending substantially helical curve around at least half of the circumference or periphery of the punching element, preferably, the entire periphery, whereby the cutting edge originates substantially at said point and is a first portion of the punching element to reach the punch or die hole when the paper punch is actuated. While in the following discussion reference will be made only to a single punching element in the paper punch, it will be understood that the paper punch may embody a plurality of punching elements.

DETAILED DESCRIPTION OF THE INVENTION

Figure 1:
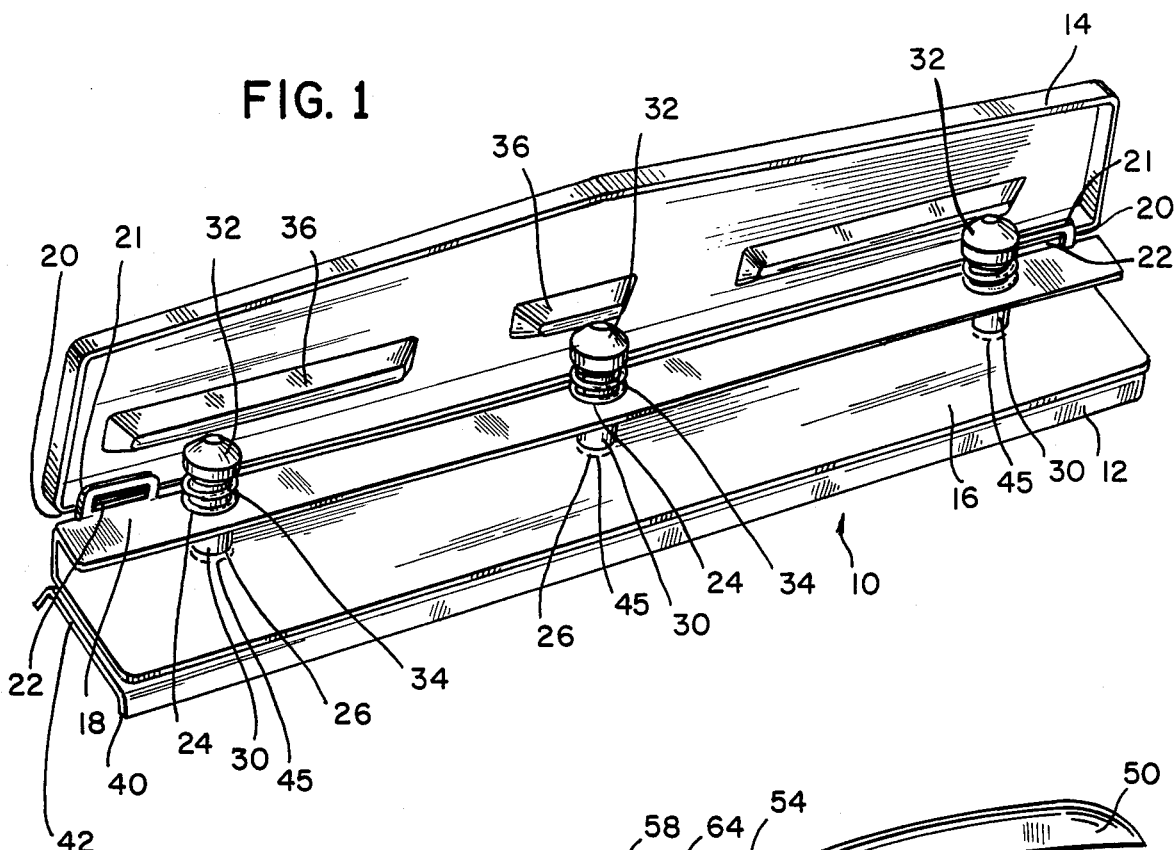
FIG. 1 is a perspective view of a paper punch embodying features of the present invention.

Referring now to the drawings and particularly to FIG. 1, a paper punch 10 has a body 12 and an actuating lever 14. The body 12 has a guiding sheet 16 with an integral parallel guide bar 18 to which the lever is hinged as shown in 20, the guide bar 18 having been formed with loops 21 into which bent tongues 22 formed on the lever 14 are inserted. The guide bar 18 and the underlying surface 16 are formed with aligned apertures 24 and 26, respectively, for receiving and guiding punching elements 30. The punching elements 30 have a cap 32, and springs 34 are interposed between the bottom of the cap 32 and the surface of the guiding bar 18 to bias each punching element 30 upwardly. The actuating lever 14 is formed with embossments 36 which engage the caps 32 of the punching elements 30 and move the punching elements 30 downwardly against the force of springs 34 when the actuating lever is pivoted in a clock-wise direction toward the guiding sheet 16. The punching elements could be formed without caps and have their free ends engaged directly by the embossments 36, if desired. The punch 10 further includes a base 40 which is of generally inverted U shaped configuration and is connected to guiding sheet 16 at its forward end but is sloped at its rearward end to define a gap 42 between the two. Base 40 is formed with punch or die holes 45 which are opposite and aligned with guide holes 26 so that each punching element 30 crosses the gap 42 and enters the die hole 45 when the punch is actuated by a pivoting of actuating lever 14 to punch holes in the paper sheets inserted in gap 42. A closure (not shown) can be provided at the bottom of base 40, if desired, to catch any paper cuttings produced by the punching elements.

It is to be understood that the paper punch body shown in FIG. 1 and described above is merely illustrative of punch bodies which can be embodied in the punch construction of the invention and the invention is in no way limited to it.

Figure 2:
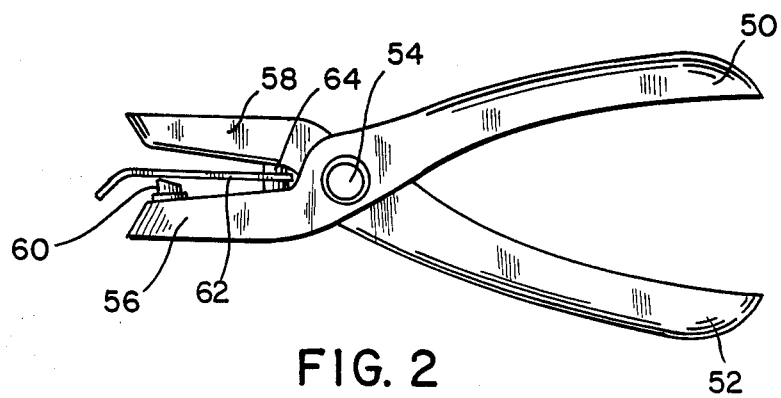
FIG. 2 is a side elevation of another form of punch embodying the invention.

For example, as seen in FIG. 2, the punch body can have the typical shape of a one-hand, one-hole paper punch wherein handles 50 and 52 are pivoted at 54 and are integral with jaws 56 and 58, the jaw 56 carrying punching element 60 and jaw 58 being provided with a cooperating die hole (not shown) a spring metal paper guide strip 62 is connected to post 64 which is connected to one of the jaws and extends through an aperture (not shown) in the other to permit the jaws to close. A wire spring in handles 50 and 52 (not shown) braces the handles 50 and 52 apart.

Figure 3:
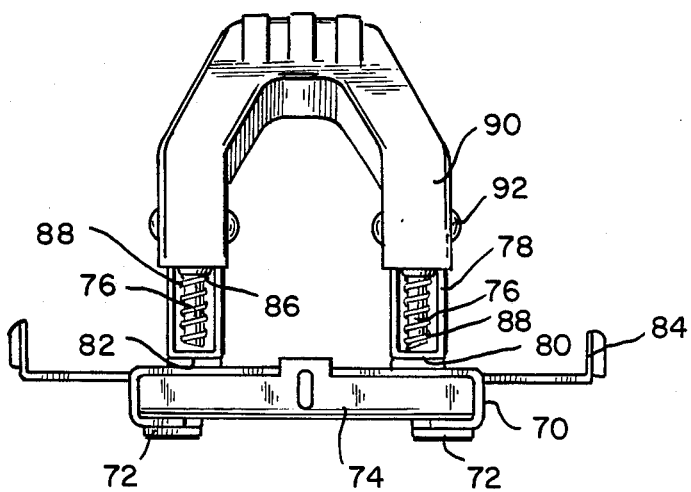
FIG. 3 is an end elevation of a still further form of punch in accordance the present invention.

FIG. 3 illustrates another form of paper punch body which can be used in accordance with this invention. In the paper punch shown in FIG. 3, base 70 has set 72 and receives a receptacle 74 for receiving the punch cuttings removed from each paper sheet when it is punched. The base 70 has die holes (not shown) for receiving the ends of punching elements 76 when the latter are actuated. The punching elements 76 are carried in the body of the paper punch by being positioned in hollow legs 78 which have a bottom 80 which are connected to one end to base 70 and is spaced at the opposite end from base 70 to define a gap 82 for the insertion of the paper to be punched. Each leg bottom 80 is apertured (not shown) to permit passage of the punching element 76 through the gap 82 into the die hole in base 70. Adjustable lateral guides 84 are slidable in base 70 in the usual manner to guide the paper inserted in the gap to be punched.

The punching elements 76, as in the embodiment of FIG. 1, are formed with a head or cap 86 and are biased upwardly by springs 88 interposed between bottom 80 and the caps 86. To actuate the paper punching elements, the paper punch body has a lever 90 pivoted at 92 to press the punching elements downwardly against the pressure of springs 88. Caps on the punching elements are not necessary.

My U.S. Pat. No. 3,987,695, which is incorporated herein by reference, illustrates another type of paper punch which can be used in accordance with this invention. In the punch shown in that patent, the lever 34 engages the punching element or plunger by interacting with a cam which is received in cut-out portions in the side of the solid cylindrical punching element, rather than engaging its top as in the embodiments of FIGS. 1 and 3.

Figure 4:
FIG. 4 is an end view of a paper-punching element of the type commonly used the prior art.
Figure 5:
FIG. 5 is a fragmentary side elevation of the punching element shown in FIG. 4.
Figure 6:
FIG. 6 is a similar side elevation of the paper punching element as shown in FIG. 4, but showing the punching element when rotate with respect to FIG. 5.

As previously mentioned, common prior art paper-punching elements have cutting ends which have a center recess or groove, which may be rounded, as shown in the above-mentioned patents, or may be V-shaped in cross-section. The latter form is shown in FIGS. 4–6.

FIGS. 7–13 are illustrative of paper punching elements used in the paper-punch construction of this invention.

Each of the punching elements shown in FIGS. 1–3 is, in the embodiments shown in FIGS. 7–12, formed from a solid, metal rod which has been milled at its leading end on one side of its axis at an oblique angle with respect to the axis and its end on its other side has been similarly machined at an oblique angle inclined in the opposite direction. Thus referring first to FIGS. 7–9, it is seen that the punching element 30 has a cutting end which has been milled, as seen at 100, to define a planar surface or "flat" on one side of its axis, or more accurately, on one side of a plane passing through its axis, which extends at an oblique angle with respect to the axis from side 102 to side 104. The side of the punching element on the opposite side of the plane passing through the axis has similarly been milled to form an oblique planar surface which extends in the opposite direction from side 104 to side 102 so that the cutting edge of the punching element 30 is given a substantially helical form ending at its forward end at point 105. The angle of slope of the two milled oblique planar surfaces can vary, but it has been found that equal slopes are preferred, and the distance a from point 105 to the bottom of slope 100 is approximately within the limits of 0.04 to point 1 inches. While the formation of the embodiment of FIGS. 7–9 has been described as being effected by milling two oppositely-sloped substantially flat planar surfaces at the leading end of the punching element, the milling can be carried out in a continuous helical manner so as to give the end of the punching element a continuous helical surface.

Figure 7:
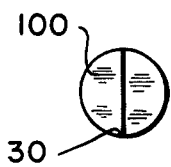
FIG. 7 is an end view of a paper punching element used in the paper-punch in accordance with the present invention.
Figure 8:
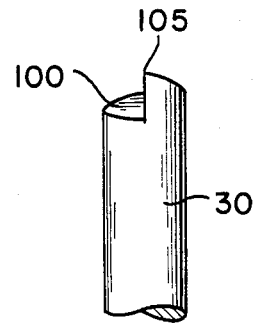
FIG. 8 is a fragmentary side elevation of the paper punching element of FIG. 7.
Figure 9:
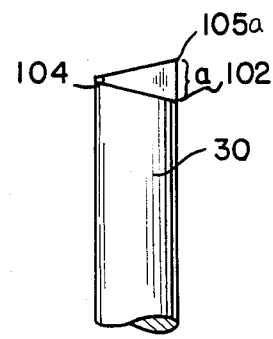
FIG. 9 is also a side elevation of the paper punching element of FIG. 7 but as sen when the punching element is rotated by 90°.
Figure 10:
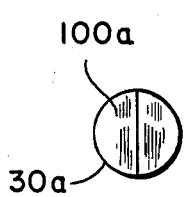
FIG. 10 is an end elevation of another paper-punching element used in the paper punch construction of this invention.
Figure 11:
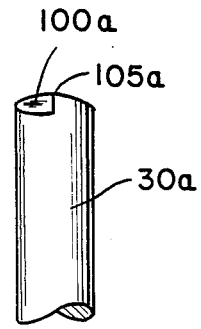
FIG. 11 is a fragmentary side elevation of the punching element of FIG. 10.
Figure 12:
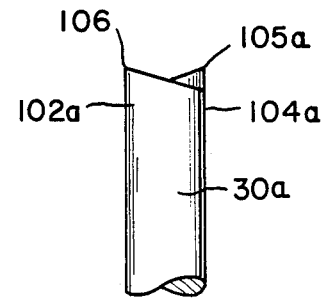
FIG. 12 is another fragmentary side elevation of the punching element of FIG. 10 to FIG. 11 but after 90° of rotation.

Referring now to FIGS. 10, 11 and 12, wherein parts corresponding to those shown in FIGS. 7–9 are given the same reference numerals to which a has been added, the end of punching element 30a has been milled, to define a planar surface on one side of its axis which extends at an oblique angle with respect to the axis from side 102a to side 104a. The side of the punching element on the opposite side of the plane passing through the axis has also been milled to form a planar surface which extends in the opposite direction from side 104a to side 102a but, like the embodiment of FIGS. 7–9, the second milled planar surface begins at the end of the leading end of punching element 38 rather than at the end of the first milled planar surface. Thus, in this embodiment, the leading end of the punching element has two cutting edges of substantially helical form ending at its forward end at points 105a and 106.

While the formation of the embodiment of FIGS. 7–9 has been described as being done by milling to oppositely-sloped substantially flat planes at the leading end of the punching element, the milling can be done in a continuous helical manner so as to give the end of the punching element a continuous helical surface.

It is appreciated that metal punches have been heretofore constructed with helical or partially-helical cutting edges but I am unaware of a paper punch construction in which the paper-punching elements have helical cutting edges such that the force necessary to punch stacks of paper is greatly reduced to about one-half of the force needed to be used with conventional punches, as in the present invention. Examples of these prior metal punch are to be found, for example, in Kennedy, U.S. Pat. No. 161,968, dated Apr. 13, 1875, and in Goodman et al, U.S. Pat. No. 294,991, dated Mar. 11, 1884.

Moreover, in a paper punch, the use of a punching element with a helical cutting edge in accordance with the invention, effective cutting of holes in the paper results even if the punching element and the die hole in the punch body are not exactly aligned. The punch elements become self-centering in a paper punch construction, and any misalignment is automatically compensated. Thus, should a misalignment exist, the helically-shaped punching element may strike the edge of the die hole but it immediately moves in the direction of least resistance, i.e. away from the edge, and as the shearing action of the cutting edge progresses, the punching element centers itself. A conventional paper punch punching element tend to dig in and operation becomes impaired.

Figure 13:
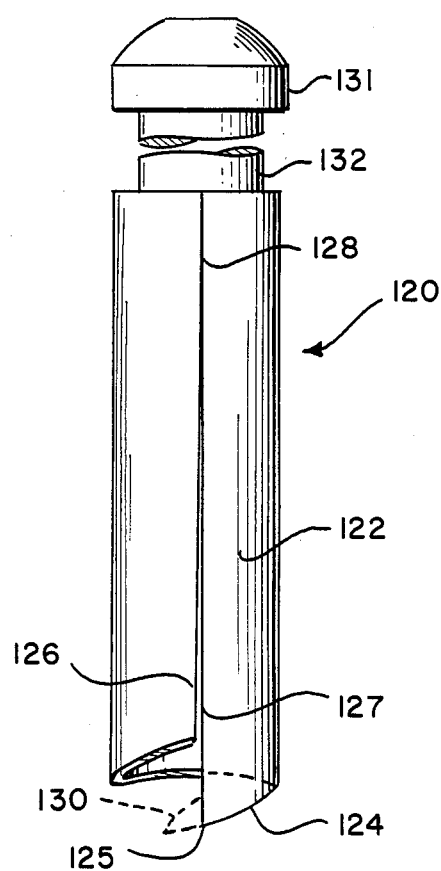
FIG. 13 is a perspective view of a punching element used in the paper punch construction of this invention and which has a body which is formed from a sheet of metal.

A particular feature of the invention resides in a particularly preferred form of punching element, which can be used in the paper punch of this invention, is shown in FIG. 13, wherein the paperpunching element is designated generally by reference number 120. The body of punching element 120 is formed from a shaped sheet of sheet metal which has been cut obliquely along one side to define (when the sheet is shaped as shown, e.g. rolled) the helical cutting edge 124 which extends from leading end 125 or point. The body 122 is hollow and is of generally cylindrical form and the two meeting, i.e. abutting, edges 126 and 127 define a joint 128.

Most preferably, the leading pointed end of the cutting edge 124 is defined by an integral pointed extension 135 which extends beyond, in a circumferential direction joint, 128. Extension 130 is shown by dotted lines in FIG. 13. A particularly effective device is provided when this pointed extension is present.

The formed metal sheet can be used as such but, if desired, a metal or plastic "cap" 131 is inserted into the opposite end of body 122. The cap and body are shown in exploded fashion in FIG. 13, but when the punching element is fully formed, the body 132 of the cap is received into the hollow portion of body 120 until the head of cap 131 engages the upper rim of the body.

Figure 14:
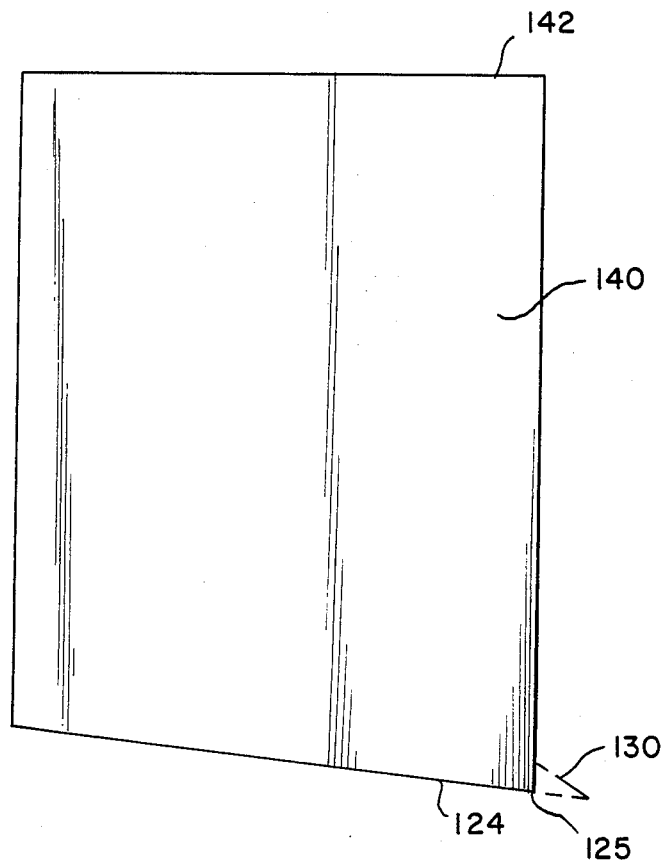
FIG. 14 is a plan view of a metal sheet or blank from which the body portion of the punching element of FIG. 13 is formed.

FIG. 14 shows a sheet metal sheet which is appropriately cut to be shaped to form the embodiment of FIG. 13. Thus, the sheet 140 has a top edge 142 which will define the top of body 120 and a bottom edge 124 which will define the cutting edge of the punching element as seen in FIG. 13. When the sheet 140 is cut as a pure trapezoid the edge which forms the cutting edge 124 ends in a point 125 but dotted lines show the preferred integral extension 130 which can be formed when the sheet 140 is cut or shaped to the form shown in FIG. 14.

The shaping of metal sheets is a well-known procedure in the metal-working art. Preferably, the sheet 140 has a thickness of 0.040–0.045 in. in order that the punching element will have desirable rigidity, but thicker or thinner sheets can be employed, as desired, e.g. 0.030–0.050 in. Metal sheets of any relatively hard metal e.g. carbon steel, can be used. The metal is preferably case hardened.

It will be understood that various changes and modifications may be made without departing from the scope of the invention as defined in the appended claims and it is intended therefore that all models contained in the foregoing description and in the drawings shall be interpreted as illustrative only and not in a limited sense.

I claim:

1. A paper punch having a body defining a gap for insertion of the material to be punched and having at least one punch hole at the bottom of said gap said means for guiding a punching element across said gap into said punch hole, at least one cylindrical punching element disposed to be guided into said punch hole, said punching element comprising a metal sheet shaped to define a generally cylindrical hollow body having a cutting end defined by an end edge of said sheet and defining a cutting edge which extends helically around the entire circumference of said body, said sheet having its lateral edges abutting along a longitudinal line of the circumference of said body, and wherein said cutting edge has a terminal circumferentially-extending projection which terminates in a point and provides a continuation of said cutting edge and extends circumferentially beyond said longitudinal line.

2. A punching element for a paper punch comprising a metal sheet shaped to define a generally cylindrical hollow body having a cutting end defined by an end edge of said sheet and defining a cutting edge which extends helically around the entire circumference of said body, said sheet having its lateral edges abutting along a longitudinal line of the circumference of said body, wherein said cutting edge has a terminal circumferentially-extending projection which terminates in a point and provides a continuation of said cutting edge and extends circumferentially beyond said longitudinal line.

* * * * *